May 28, 1963   SHAFI-UDDIN AHMED CHOUDHURY   3,091,727
SYNCHRONIZING CONNECTIONS FOR DYNAMO-ELECTRIC MACHINES
Filed Sept. 12, 1960
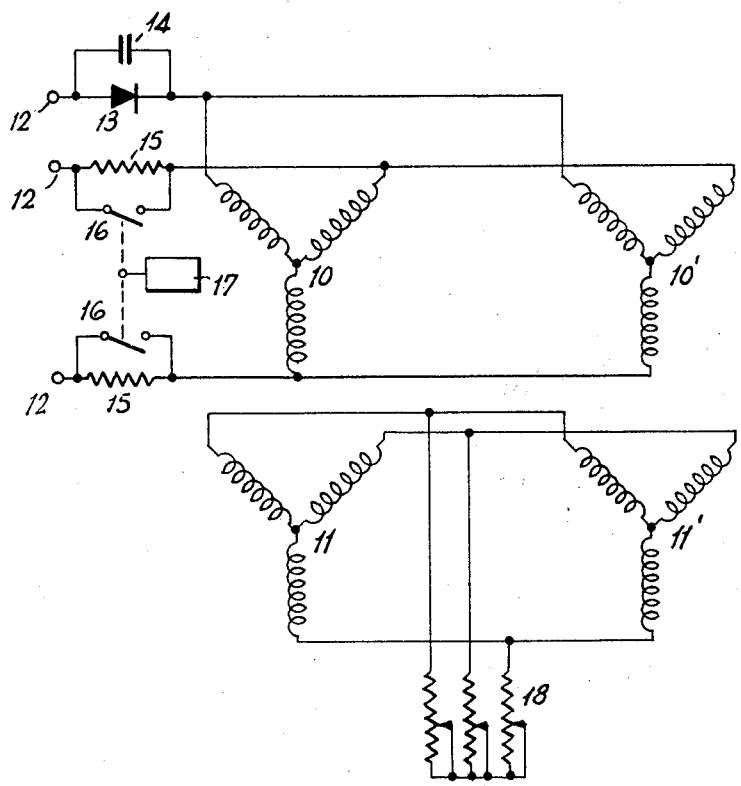
INVENTOR
SHAFI-UDDIN AHMED CHOUDHURY
ATTORNEY

United States Patent Office

3,091,727
Patented May 28, 1963

3,091,727
SYNCHRONIZING CONNECTIONS FOR DYNAMO-ELECTRIC MACHINES
Shafi-Uddin Ahmed Choudhury, Rugby, England, assignor to Associated Electrical Industries Limited, London, England, a British company
Filed Sept. 12, 1960, Ser. No. 55,333
Claims priority, application Great Britain Oct. 12, 1959
3 Claims. (Cl. 318—44)

This invention relates to the operation in mutual synchronism of dynamo-electric machines of the kind having polyphase primary and secondary windings, the secondary windings, in operation, being interconnected and the primary windings being connected to a common source of supply.

Machines of the type having polyphase windings both on the stator and rotor are commonly used for two or three phase slipring induction motors and are characterised by the use of either winding for connection to a commony electric supply system, these windings constituting the primary windings. The windings which are not connected to electric supply systems are interconnected with one another and constitute secondary windings. In this way currents in the secondary winding of one machine circulate through the corresponding winding of the other machine or machines and produce a synchronising torque which holds the machines together.

It was disclosed in U.S. Patent No. 2,864,041 that synchronisation could be stimulated by applying a direct current component to the primary windings of the interconnected machines, in addition to the three phase excitation normally provided.

Whether or not a direct component of current is provided in the primary windings, in the event that, on the initial interconnection of the machines to be synchronised, the relative position of the rotors be such that they are out-of-phase by a considerable amount, say 180 electrical degrees, the total motoring and synchronising torque is very high, and gradually reduce during the period that the rotors are coming into synchronism. Since the coming into synchronism is a gradual process, no mechanical shock is experienced unless a direct current is present.

The introduction of a D.C. component of current causes the rotors to come into step during the first revolution, so that if they are initially out-of-phase and the motoring torque is, therefore, high, the act of synchronising will tend to arrest the rotation of one of the rotors, thereby producing very high deceleration. Particularly when large machines are involved, this initial snatch is harmful to gears and connected apparatus.

The object of the invention is to reduce this deceleration to a considerable extent without reducing the synchronising torque correspondingly.

The invention aims to avoid this snatch by connecting a rectifier shunted by a capacitor in one of the polyphase supply lines to the machines to furnish a D.C. component of current for synchronising and limiting impedances, preferably in the form of resistors, connected in the other supply lines, means being provided for short-circuiting the impedances after a predetermined period of time after the supply has been switched on.

By introducing the limiting impedances in this manner, the motoring torque, when the rotors are displaced relative to one another, is reduced and, therefore, the initial speed is lower, but the D.C. component of current which produces the major proportion of synchronising torque is reduced by a much smaller amount. Thus, because the speeds of the machines at synchronism have been reduced, the deceleration is lower when synchronisation occurs and the mechanical snatch is thereby reduced.

In order that the invention may be more readily understood, reference will now be directed to the accompanying drawing, which illustrates an embodiment of the same.

Referring to the drawing, we have indicated at A and B dynamo-electric machines of the kind with which the invention is concerned, connected to operate in mutual synchronism. Common elements on both machines are indicated by the same reference numerals, those applying to machine B being provided with a prime.

Each machine is provided with polyphase primary windings 10, 10' and polyphase secondary windings 11, 11', the secondary windings being mutually inter-connected. It is intended that the secondary windings be located on the rotor of the machine, and the primary windings on the stator; these positions may be reversed, if desired.

The primary windings of the machines are connected to the corresponding phases of a polyphase source of supply indicated by terminals 12. One of the phases of the primary windings of each machine is connected to a phase of the supply through a rectifier 13, shunted by an impedance 14, shown as a condenser. The effect of the rectifier 13 and condenser 14 is to provide a D.C. component in the primary windings of machine A and B by rectification of alternating half-waves of the supply.

The remaining two phases of the supply are connected to the other phases of the primary windings of machines A and B through an impedance, shown as resistances 15. Resistances 15 are shown as being capable of being short-circuited by switches 16, the operation of the switches being effected by delay means indicated at 17. Delay means 17 effects the closure of switches 16 a predetermined time after the polyphase supply has been connected to the primary windings of the machines.

The unidirectional component of the alternating supply introduced into the primary windings of the machines by means of rectifier 13 and condenser 14 causes the machines to synchronise even though their relative positions may be displaced when the supply is initially connected to the primary windings. As explained heretofore, the sudden synchronising torque produced by the D.C. component of current in the primary windings, when the rotors of the machines are displaced relative to one another, tends to cause snatch which is undesirable. This snatch is materially reduced by the current limiting effect of the resistances 15 connected in series with the two phases of the supply which do not contain a rectifier.

The invention may be applied to the case in which machines A and B are large induction motors adapted to be run in synchronism, and are provided in their secondary circuits with common rotor resistances indicated at 18 for the purpose of speed control.

What I claim is:

1. A system for operating in mutual synchronism dynamo-electric machines each having polyphase primary and secondary windings on relatively rotatable parts of the machine comprising a source of polyphase voltage, means connecting said course to the primary polyphase windings of said machines, means interconnecting the polyphase secondary windings on said machines, rectifier means included in the connection between one of the phases of said source and the primary windings of said machines whereby to introduce into said primary windings a direct component of current derived from said source, impedance means shunting said rectifier means to permit the flow of alternating current from said source into said primary windings, impedances included in series in the connection between the other phases of said source and said primary windings of said machine and switching means for short-circuiting said impedances after said source has been connected to said primary windings.

2. A system for operating in mutual synchronism dynamo-electric machines each having polyphase primary and secondary windings on relatively rotatable parts of the machine, comprising a source of polyphase voltage, means connecting said source to the primary polyphase windings of said machines, means interconnecting the polyphase secondary windings on said machines, half-wave rectifier means included in the connection between one of the phases of said source and the primary windings of said machines, whereby to introduce into said primary windings a direct component of current derived from said source, a capacitor shunting said rectifier means to permit the flow of alternating current from said source into said primary windings, a resistance included in series in the connection between the other phases of said source and the primary windings of said machines, and delayed action switching means for short-circuiting said resistances subsequent to the connection of said source to said primary windings.

3. A system for operating in mutual synchronism dynamo-electric machines each having polyphase primary and secondary windings on relatively rotatable parts of the machine comprising a source of polyphase voltage, means connecting said source to the primary polyphase windings of said machines, means interconnecting the polyphase secondary windings on said machines, half-wave rectifier means included in the connection between one of the phases of said source and the primary windings of said machines, whereby to introduce into said primary windings a direct component of current derived from said source, a capacitor shunting said rectifier means to permit the flow of alternating current from said source into said primary windings, a resistance included in the connections between the other phases of said source and said primary windings of said machines, delayed action switching means for short-circuiting said resistances subsequent to the connection of said source to said primary windings and star-connected variable resistances connected to the interconnections between the secondary windings of said machines.

References Cited in the file of this patent

UNITED STATES PATENTS

| | | |
|---|---|---|
| 1,965,414 | Hardy | July 3, 1934 |
| 2,833,972 | Hittle et al. | May 6, 1958 |

OTHER REFERENCES

Electric Motors in Industry, Shoults, Rife, and Johnson, pages 168–178; John Wiley and Sons, New York, 1942.

Steinmetz, C. P.: Theory and Calculation of Electrical Apparatus, pages 166, 167, McGraw-Hill, New York, 1917.

Maccall, W. T.: A.-C. Electrical Engineering, pp. 224–225, University Press, London, 1923.